United States Patent
Ramsch

(10) Patent No.: US 9,449,207 B2
(45) Date of Patent: Sep. 20, 2016

(54) RFID READER DEVICE AND ANTENNA DEVICE

(71) Applicant: Checkpoint Systems, Inc., Thorofare, NJ (US)

(72) Inventor: Georg Ramsch, Oftersheim (DE)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 14/645,584

(22) Filed: Mar. 12, 2015

(65) Prior Publication Data

US 2015/0261985 A1    Sep. 17, 2015

(30) Foreign Application Priority Data

Mar. 13, 2014    (DE) .................. 10 2014 003 409

(51) Int. Cl.
| | | |
|---|---|---|
| *H01Q 7/00* | (2006.01) | |
| *G06K 7/10* | (2006.01) | |
| *H01Q 1/22* | (2006.01) | |
| *H01Q 3/26* | (2006.01) | |
| *H01Q 21/00* | (2006.01) | |

(52) U.S. Cl.
CPC ....... *G06K 7/10336* (2013.01); *G06K 7/10356* (2013.01); *H01Q 1/2216* (2013.01); *H01Q 3/26* (2013.01); *H01Q 7/00* (2013.01); *H01Q 21/00* (2013.01)

(58) Field of Classification Search
USPC ........................................................ 343/702
See application file for complete search history.

(56) References Cited

U.S. PATENT DOCUMENTS

| | | | | |
|---|---|---|---|---|
| 6,184,833 B1* | 2/2001 | Tran | ......... | H01Q 1/243 343/700 MS |
| 6,259,407 B1* | 7/2001 | Tran | ......... | H01Q 1/243 343/700 MS |
| 6,373,436 B1* | 4/2002 | Chen | ......... | H01Q 1/243 343/700 MS |
| 2001/0000960 A1 | 5/2001 | Dettloff | | |
| 2008/0174505 A1* | 7/2008 | Wong | ......... | H01Q 9/285 343/795 |

FOREIGN PATENT DOCUMENTS

| | | |
|---|---|---|
| DE | 102010009214 A1 | 8/2011 |
| GB | 2330695 A | 4/1999 |
| WO | 2009146272 A1 | 12/2009 |
| WO | 2014029452 A1 | 2/2014 |

OTHER PUBLICATIONS

European Search Report and Written Opinion of corresponding European Application No. 15158970.2 mailed Aug. 12, 2015.

* cited by examiner

*Primary Examiner* — Christle I Marshall
(74) *Attorney, Agent, or Firm* — Nelson Mullins Riley & Scarborough, LLP

(57) ABSTRACT

An RFID reader device and an antenna device have a first antenna implemented as a near-field antenna, wherein the first antenna has a first dual strip line. The first antenna has a first strip line and a second strip line. The first strip line and the second strip line may be implemented in the form of open loops. The first strip line may be implemented inside the open loop of the second strip line.

18 Claims, 4 Drawing Sheets

RFID READER DEVICE AND ANTENNA DEVICE

CROSS-REFERENCE TO RELATED APPLICATIONS

This application claims the benefit of German Patent Application No. 102014003409.7 filed Mar. 13, 2014, the entire contents of which are incorporated herein by reference.

BACKGROUND OF THE INVENTION

1. Technical Field

The present invention relates to an RFID reader device and an antenna device.

2. Background Information

Antennas are known from "Rothammels Antennenbuch [Antenna Book]", A. Krischke, 12th edition, 2001. Various forms of antennas are explained on pages 65 to 71. The antenna has the task of converting the conducting wave originating from the transmitter into the sky wave or vice versa, receiving the sky wave from space and converting it into the conducting wave, which is then fed to the receiver. The antenna is a transmission region, which can be conceived as a spread out line. It acts as an adaptation transformer between line and free space. A progressive wave forms in the case of power adaptation, which is desired in the case of transmitting and receiving.

Dual wire lines are explained on pages 107 to 111, which consist of two wires extending in parallel, having a small distance in relation to the wavelength. Dual wire lines, double lines, or also parallel wire lines are constructed symmetrically in relation to ground. Strip lines and microstrip lines are explained on page 112. If a lossless line is terminated at its end with a load resistance, which corresponds to the line surge impedance, the power running toward the termination resistor is consumed completely therein. This case is the ideal adaptation. The adaptation factor is the inverse of the ripple. The adaptation factor assumes the value 1 in the case of adaptation and the value 0 in the case of open circuit or short circuit. According to pages 118, 119, feed lines which transmit high frequencies tend to act as an antenna themselves. The radiation emitted into their surroundings can cause undesired directionality and losses. Radiating feed lines can also induce interference of broadcast radio and television reception. This side effect is typically more unpleasant than the slight radiation loss. The undesired radiation of feed lines is dependent, on the one hand, on the construction of the line and, on the other hand, on the degree of maladjustment to the line, it increases with increasing ripple. Dual wire lines are symmetrical to ground, both individual conductors have equal cross section and identical ground ratios. Therefore, the current flowing in the two conductors are also of equal amount, but oriented in opposite directions. The magnetic fields behave similarly. They would cancel out if both conductors were spatially coincident, which cannot be practically implemented, however. Because of the spatial distance of the two conductors, which is always present, the canceling is not complete. The loss radiation of a dual wire line grows directly with the square of the conductor distance and the operating frequency. This means that the conductor distance should become less with increasing frequency.

Baluns are explained on pages 145 to 155. If a phase rotation of 180° is present, the common mode waves cancel out and the differential mode waves are amplified. A differentiation is made between tuned and broadband baluns, and between non-transforming and transforming baluns. Balancing and transformation are often carried out simultaneously.

A system for RFID communication and for testing is known in U.S. Pat. No. 7,298,267 B2. In this case, an RF source is implemented to provide RF energy to an RFID transformer. The RF source outputs a continuous RF signal via a transmission line in this case. A coupler for coupling to the RFID transponder and the diode are provided separately therefrom, wherein the diode is coupled to the coupler and an interface. The interface is coupled to the diode and is adapted by means of the coupler to modulate the RF energy of the RF source. By way of the separation of the RF source from the interface, which modulates the RF energy by means of the coupler, a simple arrangement having a plurality of couplers is formed, which enables parallel testing of a large number of RFID transponders at high speed.

BRIEF SUMMARY OF THE INVENTION

One aspect of the invention is to improve an RFID reader device as much as possible. An RFID reader device for transmitting a query signal to an RFID transponder and for receiving a response signal based on the query signal is provided. In one embodiment, the RFID device has a first antenna implemented as a near-field antenna. The first antenna has a first dual strip line having a first strip line and having a second strip line, which is implemented at a constant distance to the first strip line. The first strip line is implemented in the form of an open loop. The second strip line is implemented in the form of an open loop. The first strip line is implemented inside the open loop of the second strip line in the same plane.

Experiments of the applicant have shown that a variety of advantages can be achieved by a concrete implementation of the RFID device, as is implemented in the embodiments of the figures, for example. The antenna may be implemented as particularly flat and may easily be installed below a tabletop of a point-of-sale (POS), for example, in a department store, and may be adjusted to the HF environmental conditions. The antenna field is primarily concentrated in the volume having the radius of approximately one lambda around the antenna center point, so that faulty reading of RFID transponders which are positioned laterally remote can be significantly reduced. Therefore, so-called false positive reads are avoided. Because of a distance of the first strip line to the second strip line, a high magnetic proportion in the field is achieved at close range using a differential mode operation of the antenna. At the same time, because of the symmetrical operation, the E fields cancel out at long range. In this way, a desired power drop is achieved in the far field. RFID transponders at greater distance are thus no longer activated.

A further aspect of the invention is an antenna device. Advantageous refinements of the antenna device are contained in the description. The antenna device may have a first antenna implemented as a near-field antenna. The first antenna has a first dual strip line having a first strip line and having a second strip line, which is implemented at a constant distance to the first strip line. The dual strip line is preferably a coplanar structure. The first strip line is implemented in the form of an open loop. The second strip line is implemented in the form of an open loop. The first strip line is implemented inside the open loop of the second strip line in the same plane. Further, the refinements described hereafter may refer both to the RFID device and to the antenna device.

According to one advantageous refinement, the RFID device or the antenna device may have a second antenna implemented as a near-field antenna. The second antenna has a second dual strip line having a third strip line and having a fourth strip line, which is implemented at a constant distance to the third strip line. The third strip line is implemented in the form of an open loop. The fourth strip line is implemented in the form of an open loop. The third strip line is implemented inside the open loop of the fourth strip line in the same plane as the fourth strip line. Preferably, the first strip line and the second strip line and the third strip line and the fourth strip line are implemented in the same plane.

According to one advantageous refinement, the second antenna is arranged rotated about an angle in relation to the first antenna. The angle is advantageously 60° to 120°, preferably 90°.

According to one advantageous refinement, the RFID device or the antenna device has a circuit carrier. The first strip line and the second strip line and/or the third strip line and the fourth strip line are advantageously implemented on the circuit carrier.

According to one advantageous refinement, the RFID device or the antenna device has a means, which is implemented in the region of the first strip line and the second strip line, so that a permittivity for a first signal acting on the first strip line is greater than a permittivity for a second signal acting on the second strip line.

According to one advantageous refinement, the RFID device or the antenna device has a circuit carrier material. The circuit carrier material advantageously has openings in the region of the second strip line. The circuit carrier material preferably does not have openings in the region of the first strip line.

According to one advantageous refinement, the RFID device or the antenna device has an insulation material. The insulation material is advantageously arranged in the region of the first strip line. The insulation material is preferably not arranged in the region of the second strip line.

According to one advantageous refinement, the RFID device has a circuit. First terminals of the first dual strip line are advantageously connected to the circuit. Second terminals of the first dual strip line are preferably connected to a first termination.

According to one advantageous refinement, first terminals of the second dual strip line are connected to the circuit. Second terminals of the second dual strip line are advantageously connected to a second termination.

According to one advantageous refinement, the circuit is implemented to output the query signal as a first differential signal at the first terminals of the first dual strip line. According to one advantageous refinement, the circuit is implemented to output the query signal as a second differential signal at the second terminals of the second dual strip line.

According to one advantageous refinement, a first feed line between a terminal of the first strip line and the circuit is longer than a second feed line between a terminal of the second strip line and the circuit. According to one advantageous refinement, a third feed line between a terminal of the third strip line and the circuit is longer than a fourth feed line between a terminal of the fourth strip line and the circuit.

According to one advantageous refinement, to set a phase difference between the first antenna and the second antenna, two lengths of second feed lines from a power splitter of the circuit to the first antenna and the second antenna are different. The power splitter of the circuit is advantageously implemented to output the signals for the antennas at its outputs, wherein the signals have a phase difference (for example, 90°).

The above-described refinement variants are particularly advantageous both individually and also in combination. In this case, all refinement variants can be combined with one another. Some possible combinations are explained in the description of the exemplary embodiments of the figures. These possible combinations illustrated therein of the refinement variants are not exhaustive, however.

BRIEF DESCRIPTION OF THE DRAWINGS

The invention is explained in greater detail hereafter by exemplary embodiments on the basis of illustrations in the drawings.

In the figures.

DETAILED DESCRIPTION OF THE INVENTION

Figure 1:
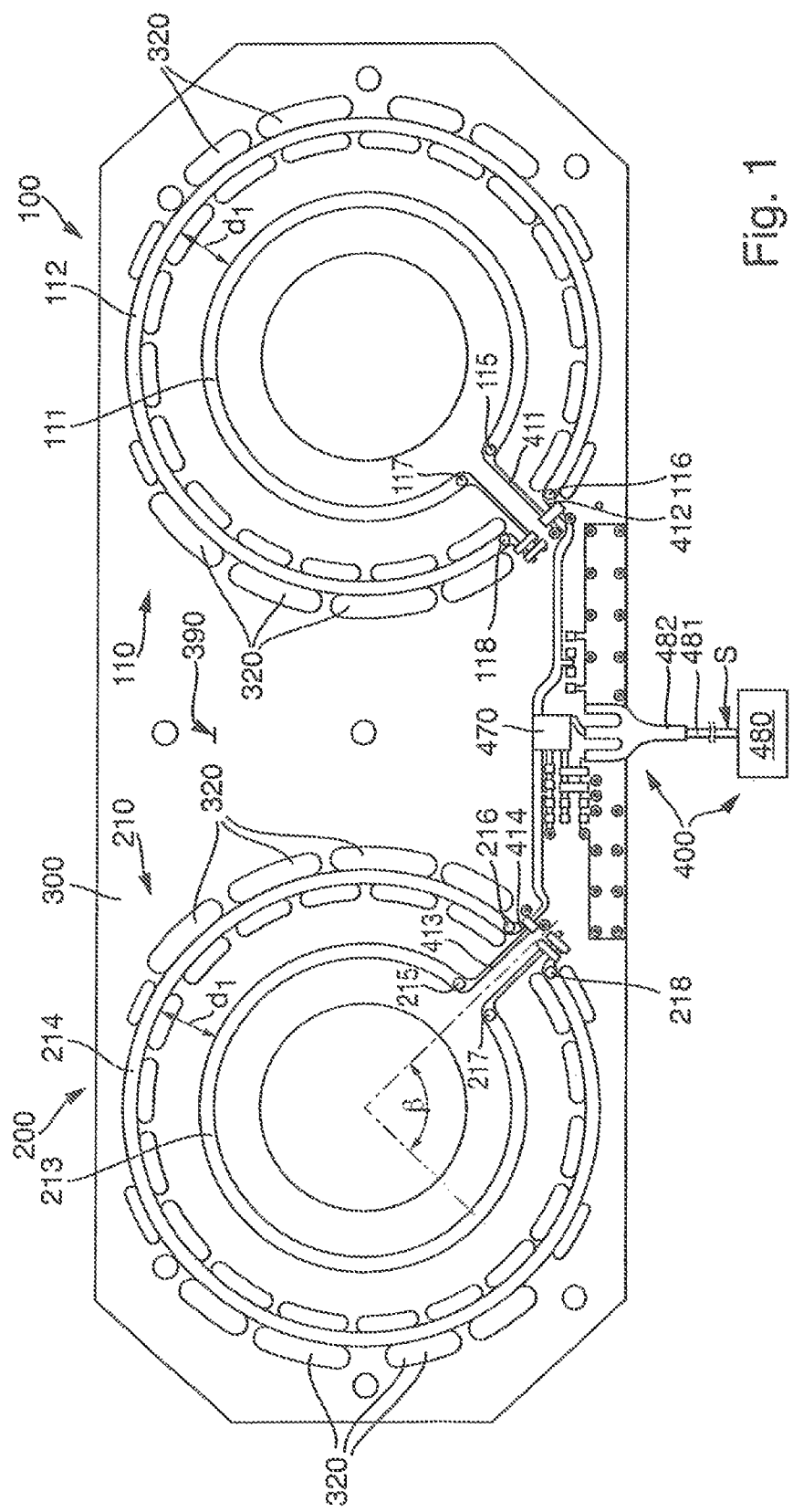
FIG. 1 shows a schematic view of an embodiment of a circuit carrier for an RFID reader device.

A first embodiment of an RFID reader device is shown schematically in FIG. 1. The RFID reader device has a circuit 400, which is partially shown as a block 480 and is partially shown as the equipment and conductor track arrangement on the circuit carrier 300. In an embodiment, the RFID reader device is configured to transmit a query signal to an RFID transponder and to receive a response signal based on the query signal. For this purpose, the circuit block 480 of the circuit 400 generates a signal S, which is transmitted via a cable 481, for example, a coaxial cable, to the HF connecting element 482.

By means of a power splitter of the circuit 400, the power of the signal S is allocated to a first antenna 100 and a second antenna 200. Alternatively to the embodiment of FIG. 1, a plurality of antennas (more than two) can be provided, which are connected to outputs of power splitters. The first antenna 100 may be implemented as a near-field antenna. The first antenna 100 has a first dual strip line 110 having a first strip line 111 and a second strip line 112. A dual strip line 110 can fundamentally be operated in various modes: common mode, even mode, or odd mode. For the differential case (odd mode, also called "push-pull" or "differential: in English), which is also referred to as differential mode operation, the fields cancel out, for example, if the field observation (measurement) is performed in the far field (3 to 4 times lambda).

The first dual strip line 110 may be implemented, for example, as an edge side coupled dual strip line. Alternatively to the embodiment of FIG. 1, the strip lines 111, 112 may be arranged as broad side coupled lines. It is also alternatively possible to implement the strip lines 111, 112 as round wires. The first strip line 111 may be implemented at a constant distance d1 to the second strip line 112. In the embodiment of FIG. 1, the first strip line 111 and the second strip line 112 of the first dual strip line 110 may have a distance d1 to one another of at least half a millimeter. The antenna gain/range is dependent on the distance d1 between the first strip line 111 and the second strip line 112. For example, the distance d1 may be greater than 5 mm.

In an embodiment, the first strip line 111 may be implemented in the form of an open loop. The open loop of the embodiment of FIG. 1 has an open circle shape in this case. The second strip line 112 is also implemented in the form of an open loop. The second strip line 112 also has an open circle shape. The first strip line 111 and the second strip line 112 are implemented without intersections. The first strip line 111 may be implemented inside the open loop of the second strip line 112 in the same plane 390. The plane 390 in the embodiment of FIG. 1 is defined by a surface 390 of the circuit carrier 300. The strip lines 111, 112, 213, 214 of the antennas 100, 200 are implemented on the surface 390 of the circuit carrier 300. A first circle, which is defined by the shape of the first strip line 111, has a smaller radius than a second circle, which is defined by the shape of the second strip line 112. Correspondingly, the first strip line 111 is significantly shorter than the second strip line 112 of the first antenna 100.

In addition, the second antenna 200 may be implemented as a near-field antenna on the circuit carrier 300. The second antenna 200 and the first antenna have an identical shape in the scope of the manufacturing precision. The second antenna 200 and the first antenna have identical dimensions in the scope of the manufacturing precision. The second antenna 200 has a second dual strip line 210 having a third strip line 213 and having a fourth strip line 214, which is implemented at a constant distance d1 to the third strip line 213. The third strip line 213 is implemented in the form of an open loop. The open loop of the embodiment of FIG. 1 has an open circle shape in this case. The fourth strip line 214 is also implemented in the form of an open loop. The fourth strip line 214 also has an open circle shape. The third strip line 213 and the fourth strip line 214 are implemented without intersections. The third strip line 213 may be implemented inside the open loop of the fourth strip line 214. The first strip line 111 and the second strip line 112 and the third strip line 213 and the fourth strip line 214 are implemented in the same plane 390. The plane 390 of the embodiment of FIG. 1 is defined by the surface 390 of the circuit carrier 300. A third circle, which is defined by the shape of the third strip line 213, has a smaller radius than a fourth circle, which is defined by the shape of the fourth strip line 214. The third strip line 213 is accordingly significantly shorter than the fourth strip line 214 of the second antenna 200.

In the embodiment of FIG. 1, the first antenna 100 is arranged offset in relation to the second antenna 200. The second antenna 200 is arranged rotated by an angle β in relation to the first antenna 100. The angle is advantageously between 60° and 120°, preferably 90°. With such a combination of two antennas 100, 200, oriented perpendicularly to one another, a combined field can exist, similar to that of a crossed dipole, so that transponders (usually having a dipole receiving characteristic) can be addressed independently of their location, in particular if the transponders are not positioned directly above the antennas 100, 200, but rather laterally offset thereto.

The RFID reader device in the embodiment of FIG. 1 has a circuit carrier 300 in the form of a printed circuit board. Metal tracks are structured as conductors on the circuit carrier 300. In the embodiment of FIG. 1, copper strips, which are covered by a protective lacquer, are provided as the metal tracks. Furthermore, the circuit carrier 300 has holes for fastening. The first strip line 111 and the second strip line 112 of the first antenna 100 are implemented on the circuit carrier 300. The third strip line 213 and the fourth strip line 214 are implemented on the circuit carrier 300 of the embodiment of FIG. 1. A first termination may be connected to the first antenna 100. The termination can also be referred to as a terminator. The termination is used to reduce reflections on the dual strip line 110.

In the case of dual strip lines 111, 112 of different lengths, the runtime of a wave on the longer strip line 112 is accordingly longer. The goal, however, is that the wave is incident as simultaneously as possible at the termination on both strip lines 111, 112. To lengthen the runtime of the wave through the first strip line 111, in the embodiment of FIG. 1, a first feed line 411 between a terminal 115 of the first strip line 111 and the circuit 400 is longer than a second feed line 412 between a terminal 116 of the second strip line 112 and the circuit 400. In the embodiment of FIG. 1, the first terminal 115 is defined by the transition between strip line 111 and feed line 411. Correspondingly, the second terminal 116 is defined by the transition between strip line 112 and feed line 412. Alternatively, a through contact or plug connection can be provided as the terminal in both cases.

To lengthen the runtime of the wave through the third strip line 213, in the embodiment of FIG. 1, a third feed line 413 between a terminal 215 of the third strip line 213 and the circuit 400 is longer than a fourth feed line 414 between a terminal 216 of the fourth strip line 214 and the circuit 400. In the embodiment of FIG. 1, the third terminal 215 is defined by the transition between strip line 213 and feed line 413. Correspondingly, the fourth terminal 216 is defined by the transition between strip line 214 and feed line 414. Alternatively, a through contact or plug connection can be provided as the terminal in both cases. Alternatively or in combination, the effect of different lengths of the strip lines 111, 112 can be at least partially compensated for in that a permittivity acting on the first strip line 111 for a first signal is greater than a permittivity acting on the second strip line 112 for a second signal. Due to the greater permittivity, the propagation speed of the wave on the shorter strip line 111 is reduced in relation to the longer strip line 112.

To reduce the permittivity, multiple openings 320 are provided in the circuit carrier material 300. The circuit carrier material 300 has openings 320 in this case in the region of the second strip line 112. In addition, the circuit carrier material 300 has openings 320 in the region of the fourth strip line 214. In contrast, no openings are provided in the region of the first strip line 111. No openings are also provided in the region of the third strip line 213. Air, which has a lower relative permittivity than the circuit carrier material 300, is in the openings.

Figure 2:
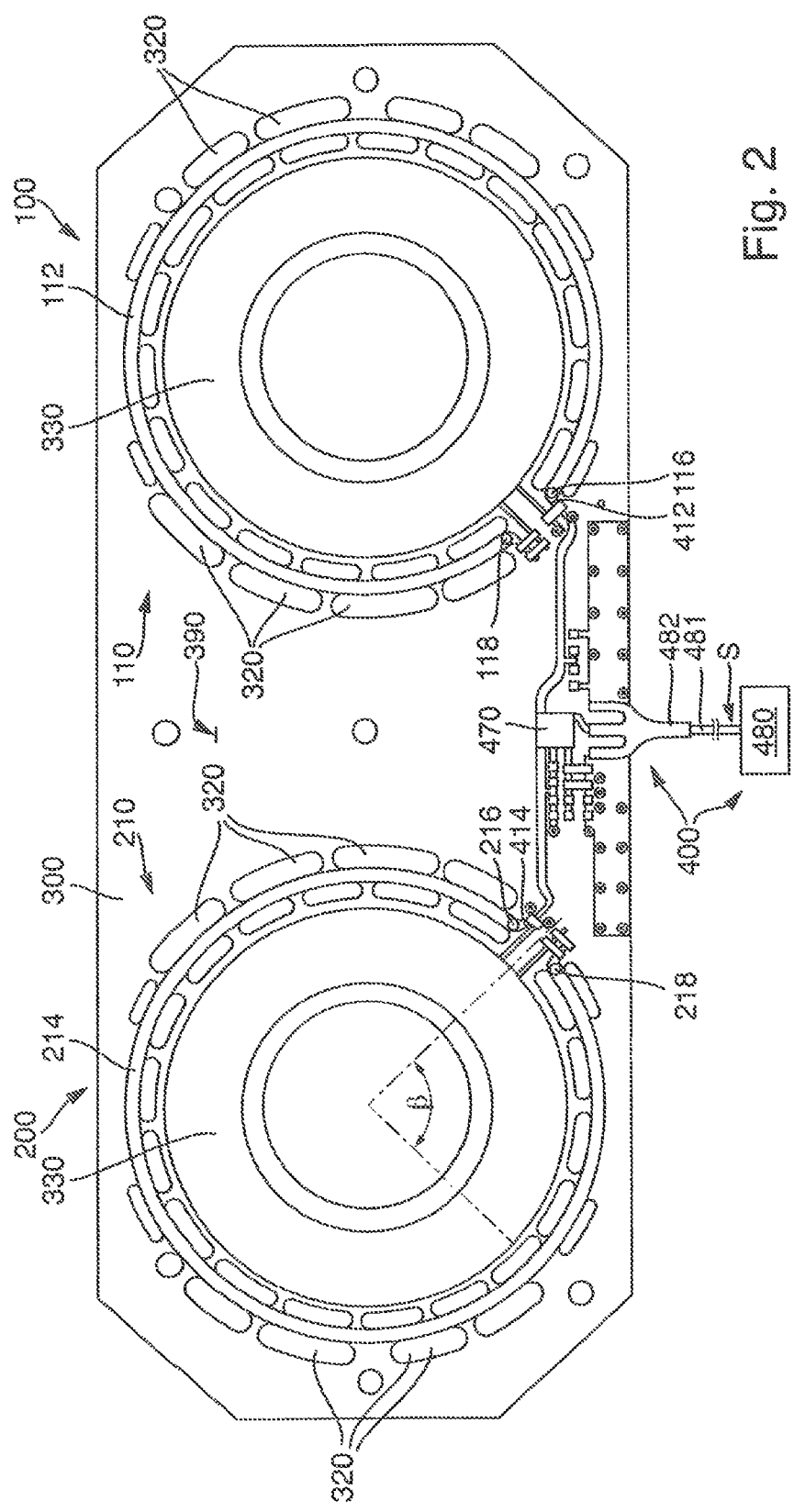
FIG. 2 shows a schematic view of a further embodiment of a circuit carrier for an RFID reader device.

Another possibility for reducing the propagation speed of the wave is schematically illustrated in FIG. 2. In this case, an insulation material 330 is used, which has a higher permittivity than air. In the embodiment of FIG. 2, the insulation material 330 is arranged in the region of the first strip line 111. In the embodiment of FIG. 2, the insulation material 330 is also arranged in the region of the third strip line 213. The holes 320 on the outer part of the dual strip line 110, 210, which can also be referred to as a strip line ring, are to reduce the effective dielectric load of the outer strip line 112 and therefore of the larger and thus longer part of the strip line ring. The runtime difference between inner ring and outer ring is hereby reduced. The additional dielectric material 330 on the inner ring also causes a reduction of the runtime difference. For the inner ring, this means an increase of the runtime in relation to the outer strip line 112.

Figure 3:
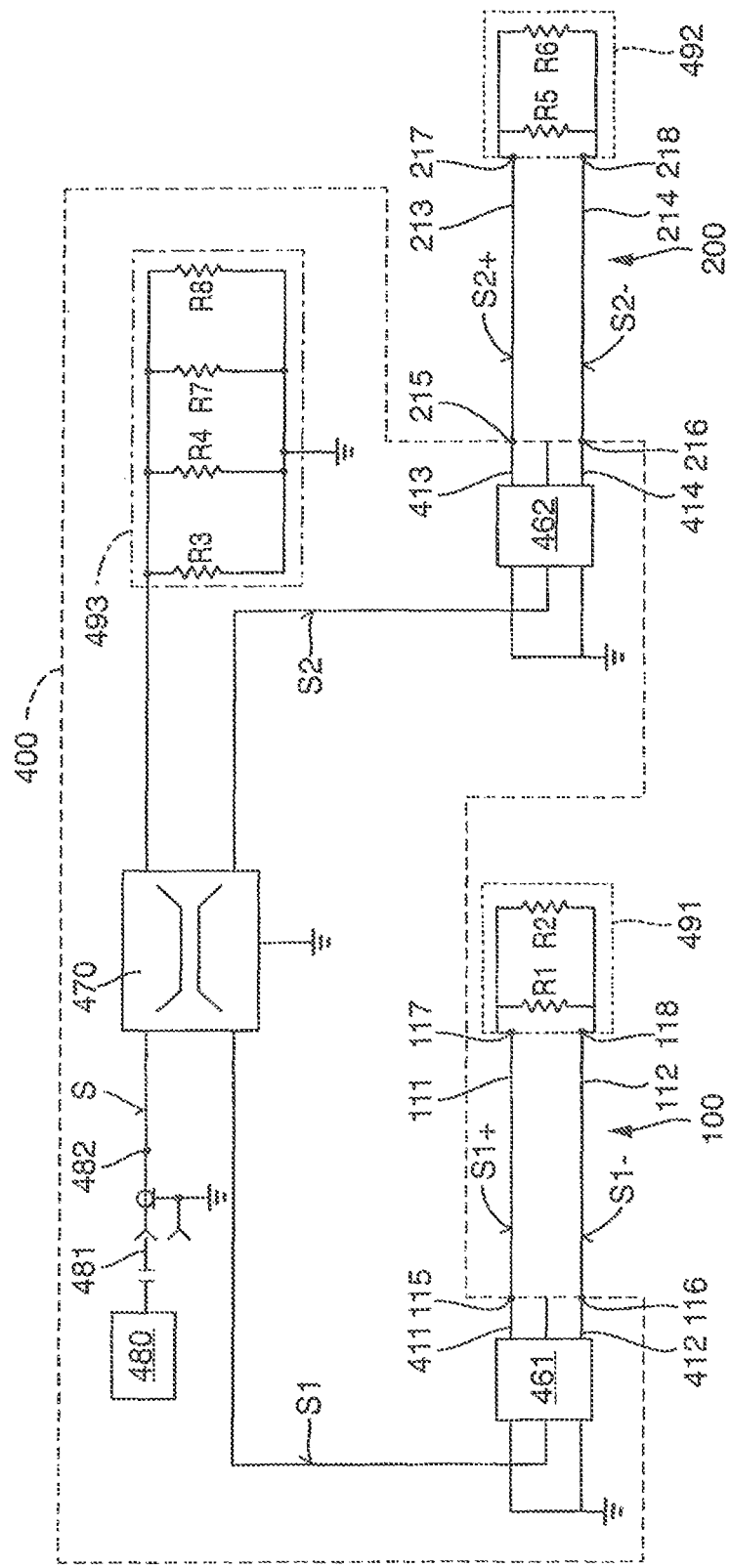
FIG. 3 shows a circuit diagram detail.

FIG. 3 schematically shows a circuit diagram of an RFID reader device. The circuit diagram shows a circuit block 480 for generating the query signal S, which is output via the cable 481 and the connection plug 482 at an input of a power splitter 470. The power splitter 470 is connected to a termination 493, which is formed from the resistors R3, R4, R7, and R8. Furthermore, the power splitter 470 is connected to a first balun 461 to output a first divided signal S1 and to a second balun 462 to output a second divided signal S2. The circuit 400 has the first balun 461 for damping a common mode signal. The circuit 400 has the second balun 462 also for damping a common mode signal.

By means of a first transformer 461 as the first balun 461, the circuit 400 is implemented to output the query signal S as a first differential signal S1+, S1− at the first terminals 115, 116 of the first dual strip line 110. By means of a second transformer 462 as the second balun 461, the circuit 400 is implemented to output the query signal S as a second differential signal S2+, S2− at the first terminals 215, 216 of the second dual strip line 210. The transformers 461, 462 are advantageously additionally implemented for the transformation of the signal S to be transmitted.

Instead of the transformers 461, 462, active components can be provided for generating a differential signal S1+, S1−, S2+, S2−.

Experiments of the applicant have shown that by way of a concrete implementation of the RFID reader device for RFID communication, a high level of security from interference can be achieved. The antennas 100, 200 do have a low efficiency of only 5%, but nonetheless measurements of the applicant have shown that the efficiency of 5% is sufficient for reading RFID transponders at close range. The reading range for RFID transponders is up to 30 cm (approximately one wavelength) in the case of a currently common sensitivity. It is therefore possible to read and write RFID labels with a sensitivity of approximately −12 dBm at a distance of 10 cm.

Because of the distance d1 of the first strip line 111 to the second strip line 112 and the differential operation (differential mode operation), a higher magnetic proportion is achieved in the field at close range. At the same time, the E fields cancel out at long range because of the differential operation (differential mode operation), so that the power decreases significantly at long range. A further advantage is achieved by the respective balun 461, 462 and the respective termination of the dual strip lines 110, 210, in that interfering fields of a remote interference source—for example, a further RFID communication signal—are incident with predominantly flat wave fronts on the antennas 100, 200 and therefore predominantly generate common mode signals, which are eliminated or at least very strongly damped by the termination and by the balun 461, 462 adapted to the termination.

The balun 461, 462 is used for damping a common mode signal. The common mode signal is caused, for example, by a high-frequency interfering signal, which originates from an interference source. The interference source is more remote from the antennas 100, 200 and is therefore at long range in this case. The radio interfering signals of the interference source 400 arrive as a predominantly flat wavefront at the antennas 100, 200 and cause the common mode signal in the strip conductors 111 and 112 or 213, 214, respectively, upon incidence on the dual strip lines 110, 210. Common mode signals are suppressed by the balun 461, 462 and a so-called reader-reader collision or interfering signals of other radio sources are reduced.

Due to the output of a differential signal S1+, S1− on the first dual strip line 110, a differential mode operation is caused by means of the balun 461, in that a field is generated in each strip line 111, 112, wherein an electromagnetic field having high magnetic proportion is generated in the near field. In contrast, a first electrical field of the first strip line 111 and a superimposed second electrical field of the second strip line 112 cancel out because of the differential mode operation at long range (far field). This is also true for a differential signal S2+, S2− on the second dual strip line 210. If the interference source is accordingly an RFID transponder, this "interfering transponder" is not activated because of the small far field generated by the antennas 100, 200 in differential mode operation.

Alternatively to the power splitter 470, a changeover switch is provided. By means of the changeover switch, it is possible to switch between the first antenna 100 and the second antenna 200. Each antenna 100, 200 then transmits in one time interval at maximum power. The first antenna 100 may be connected to the first transformer 461 via the feed lines 411, 412 to the terminals 115, 116. The means 320, 330 mentioned in FIGS. 1 and 2 in the region of the first strip line 111 and/or the second strip line 112 cause a permittivity acting for a first signal S1+ on the first strip line 111 to be greater than a permittivity acting for a second signal S1− on the second strip line 112.

The first strip line 111 and the second strip line 112 of the first antenna 100 may be connected via the first terminals 115, 116 to the circuit 400. Second terminals 117, 118 of the first strip line 111 and the second strip line 112 may connected to a first termination. The first termination has the resistors R1 and R2. The third strip line 213 and the fourth strip line 214 of the second antenna 200 may be connected via the first terminals 215, 216 of the first antenna to the circuit 400. Second terminals 217, 218 of the third strip line 213 and the fourth strip line 214 may be connected to a second termination 492. The second termination 492 has the resistors R5 and R6.

Figure 4:
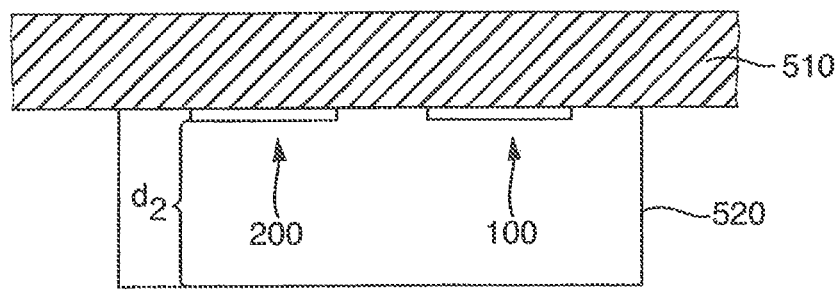
FIG. 4 shows a schematic sectional view.

FIG. 4 schematically shows a first antenna 100 and a second antenna 200 of an RFID reader device in the installed state in a sectional view. The antennas 100, 200 are fastened in this case below a tabletop 510. Alternatively to the arrangement below the tabletop 510, in an embodiment deviating from FIG. 4, the antennas 100, 200 are arranged on the tabletop 510. It is also possible to arrange the antennas 100, 200 inside the tabletop 510. In addition, a shield 520 is arranged below the tabletop 510. The shield 520 consists in the simple case of appropriately bent sheet-metal. The distance d2 between the shield 520 and the antennas 100, 200 is preferably greater than the Fraunhofer distance=0.159×λ, with λ as the wavelength. The Fraunhofer distance can also be defined as the limit of the reactive near field. The distance is approximately 50 mm, for example, for a frequency of 868 MHz. In this way, a low level of magnetic interaction with the antennas 100, 200 is achieved.

Figure 5:
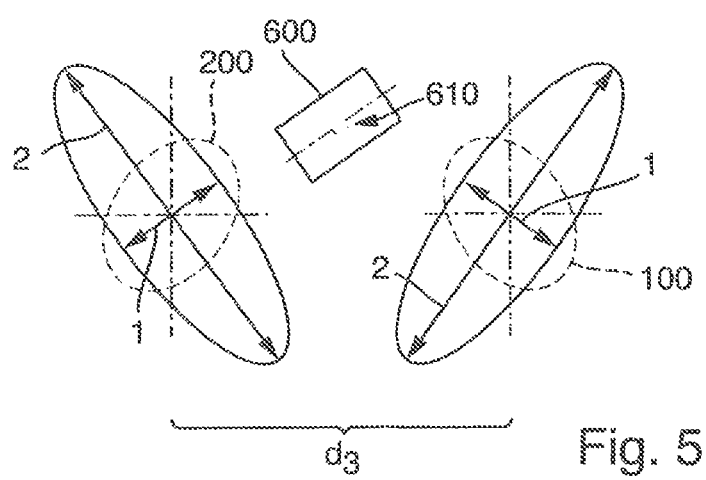
FIG. 5 shows a schematic illustration of electromagnetic fields.

FIG. 5 schematically shows the electromagnetic field emitted by the antennas 100, 200. In this case, the respective electromagnetic field of the respective antenna 100, 200 is shown individually. If both antennas 100, 200 are active simultaneously, the electromagnetic fields of both antennas 100, 200 are superimposed (not shown). Alternatively, the antennas 100, 200 are alternately active, in particular operated by means of time multiplexing. If both antennas 100, 200 having the strip line ring structures are operated simultaneously, a field overlay results to form an overall field. By means of alternating operation, the preferential directions (axial ratio of the antenna field lobes) can actually be 90° to one another. A first center point of the first antenna 100 and a second center point of the second antenna 200 are spaced apart from one another by the distance d3. The distance d3 is to be determined in this case in dependence on the material of the tabletop 510 and the distance d2 between antennas 100, 200 and shield plate 520. In the exemplary embodiment of FIG. 5, the distance d3 between the center points is d3=λ/2.

A transponder 600 and the alignment of its dipole characteristic 610 are also schematically shown. In the embodiment of FIG. 5, the transponder 600 is positioned in a Fresnel zone adjoining the reactive near field beyond the Fraunhofer distance in relation to the antennas 100, 200. The field propagation in the reactive near field primarily consists in this case of a magnetic component. In a transition region between 0.159λ to 1λ, E field and H field have a mixed effect on the transponder 600. The E field primarily acts between 1λ and 4*λ. In this case, 4*λ is the boundary between Fresnel zone and so-called far field. The E field vector cancels out with increasing distance in this case. Using transponders 600 of current sensitivity, the detection limit, depending on the sensitivity of the circuit 400, the effective antenna area of the transponder 600, and the spatial orientation of the transponder 600, is between 1*λ and 4*λ.

In spite of the circular shape of the antennas 100, 200, both antennas have a preferential direction. In this case, an axial ratio of the field lobes in the embodiment of FIG. 5 is approximately 2:1. The axial ratio is the ratio of the orthogonal components of a E field. A circularly polarized field is generated from two orthogonal E field components of equal amplitude (and 90° phase shift). At equal amplitude, the axial ratio is 1:1. In contrast, the axial ratio for the ellipse shown in FIG. 5 is greater than 1 (>0 dB). The field lobes have an elliptical shape in the embodiment of FIG. 5. The axial ratio changes in this case with the distance from the main radiation direction of the antennas 100, 200. For example, the axial ratio increases as the lateral distance becomes greater to the antennas 100, 200. The axial ratio is additionally structurally dependent on multiple factors, such as a runtime difference between inner strip loop 111, 213 and outer strip loop 112, 214, and also the feed 461, 462, which acts as a Hertzian dipole, or termination, the effect of which can be in the percent range. A power ratio P(2):P(1) of 4:1 is caused by the axial ratio of 2:1. In the case shown in FIG. 5, the RFID transponder 600 is therefore predominantly queried by the field of the first antenna 100.

The invention is not restricted to the illustrated embodiment variants of FIGS. 1 to 5. For example, it is possible to provide a greater number of antennas in an antenna matrix, wherein the antennas are rotated by an angle in relation to one another. It is also possible to provide another shape (oval, elliptical) of the loops. The functionality of the assembly according to FIG. 1 can be used particularly advantageously for an RFID system in a cashier area of a department store.

I claim:

1. An RFID reader device, comprising:
a printed circuit board;
a first antenna implemented as a near-field antenna, wherein the first antenna comprises a first dual strip line;
a first strip line implemented in the form of an open loop; and
a second strip line implemented in the form of an open loop, wherein the first strip line and the second strip line are positioned on the printed circuit board as respective portions of the first dual strip line, and wherein the first strip line is positioned inside the open loop of the second strip line.

2. The RFID reader device according to claim 1, further comprising:
a second antenna implemented as a near-field antenna, wherein the second antenna has a second dual strip line;
a third strip line implemented in the form of an open loop; and
a fourth strip line implemented in the form of an open loop, wherein the third strip line is positioned inside the open loop of the fourth strip line, and wherein the third strip line and the fourth strip line are positioned in the same plane.

3. The RFID reader device according to claim 2, wherein the second antenna is arranged rotated in relation to the first antenna by an angle (β).

4. The RFID reader device according to claim 2, further comprising a circuit, wherein first terminals of the second dual strip line are connected to the circuit.

5. The RFID reader device according to claim 1, wherein the printed circuit board comprises
a circuit carrier, wherein the first strip line and the second strip line are positioned on the circuit carrier.

6. The RFID reader device according to claim 1, wherein a permittivity acting for a first signal (S1 +) on the first strip line is greater than a permittivity acting for a second signal (S1−) on the second strip line.

7. The RFID reader device according to claim 1, further comprising:
a circuit carrier material, wherein the circuit carrier material has openings in the region of the second strip line.

8. The RFID reader device according to claim 1, further comprising:
an insulation material, wherein the insulation material is arranged in the region of the first strip line.

9. The RFID reader device according to claim 1, further comprising a circuit, wherein first terminals of the first dual strip line are connected to the circuit.

10. The RFID reader device according to claim 9, wherein:
the circuit is implemented to output the query signal as (1) a first differential signal (S1+, S1) at the first terminals of the first dual strip line; and a (2) second differential signal (S2+, S2−) at the first terminals of the second dual strip line.

11. The RFID reader device according to claim 9, wherein:
a first feed line between a terminal of the first strip line and the circuit is longer than a second feed line between a terminal of the second strip line and the circuit; and
a third feed line between a terminal of the third strip line and the circuit is longer than a fourth feed line between a terminal of the fourth strip line and the circuit.

12. The RFID reader device of claim 1, wherein the RFID reader device is configured to transmit a query signal to an RFID transponder and receive a response signal based on the query signal.

13. The RFID reader device of claim 1, wherein the second strip line is implemented at a constant distance (d1) to the first strip line.

14. The RFID reader device of claim 1, wherein the first strip line is implemented inside the open loop of the second strip line in the same plane.

15. An antenna device, comprising:
a first antenna implemented as a near-field antenna, wherein the first antenna has a first dual strip line;
a first strip line implemented in the form of an open loop; and a second strip line implemented in the form of an open loop, wherein the first strip line and the second strip line are portions of the first dual strip line, and wherein the first strip line is positioned inside the open loop of the second strip line.

16. The antenna device of claim 15, wherein the antenna device is configured to transmit a query signal to an RFID transponder and receive a response signal based on the query signal.

17. The antenna device of claim 15, wherein the second strip line is implemented at a constant distance (d1) to the first strip line.

18. The antenna device of claim 15, wherein the first strip line is implemented inside the open loop of the second strip line in the same plane.

* * * * *